United States Patent
Pierron et al.

(10) Patent No.: US 7,200,327 B2
(45) Date of Patent: Apr. 3, 2007

(54) ELECTRIC HEATING DEVICE, IN PARTICULAR FOR A VEHICLE HEATING AND/OR AIR-CONDITIONING APPARATUS

(75) Inventors: Frédéric Pierron, Rambouillet (FR); Gilbert Terranova, Le Perray en Yvelines (FR); Christophe Marange, Chatou (FR); Olivier Colette, Le Mesnil Saint Denis (FR)

(73) Assignee: Valeo Climatisation, Le Mesnil St Denis (FR)

( * ) Notice: Subject to any disclaimer, the term of this patent is extended or adjusted under 35 U.S.C. 154(b) by 0 days.

(21) Appl. No.: 11/351,916

(22) Filed: Feb. 10, 2006

(65) Prior Publication Data

US 2006/0222346 A1    Oct. 5, 2006

Related U.S. Application Data

(63) Continuation of application No. 10/510,769, filed on Oct. 12, 2004, now abandoned.

(51) Int. Cl.
*F24D 5/10* (2006.01)

(52) U.S. Cl. ............... 392/350; 392/485; 219/486; 219/492; 219/205; 165/148

(58) Field of Classification Search ............... 392/350, 392/485; 219/541, 530, 540, 202, 486, 492, 219/205; 165/148
See application file for complete search history.

(56) References Cited

U.S. PATENT DOCUMENTS

| | | | |
|---|---|---|---|
| 6,037,567 A * | 3/2000 | Inoue et al. | 219/202 |
| 6,055,360 A * | 4/2000 | Inoue et al. | 392/485 |
| 6,265,692 B1 * | 7/2001 | Umebayahi et al. | 219/202 |
| 6,353,707 B1 * | 3/2002 | Loktev et al. | 392/435 |
| 6,392,207 B2 * | 5/2002 | Beetz et al. | 219/530 |
| 6,472,645 B1 * | 10/2002 | Bohlender | 219/505 |
| 6,723,966 B2 * | 4/2004 | Jiang | 219/505 |
| 6,810,203 B2 * | 10/2004 | Alban et al. | 392/347 |
| 6,832,648 B2 * | 12/2004 | Torigoe et al. | 165/148 |
| 6,880,762 B2 * | 4/2005 | Erbacher | 237/12.3 B |
| 6,919,535 B2 * | 7/2005 | Uhl et al. | 219/202 |
| 6,940,050 B2 * | 9/2005 | Probst | 219/486 |

* cited by examiner

*Primary Examiner*—Robin Evans
*Assistant Examiner*—Vinod Patel
(74) *Attorney, Agent, or Firm*—Ronald Courtney

(57) ABSTRACT

Electric heating device comprising an electric radiator (10) for heating the air passing through it, said radiator comprising a casing (12), at least one resistive element mounted in the casing and constituted by at least one zigzag metal strip (22) which is disposed so as to be directly exposed to the air passing through the casing, and a circuit (30) for controlling the electrical supply of the resistive element or elements connected to a power supply.

The electric radiator (10) comprises a set of individual heating modules (20) disposed parallel to one another in the casing (12) and so as to be directly exposed to the air passing through the casing, each heating module (20) comprising a pleated or corrugated metal strip (22) and an electronic switch controlled by the control circuit (30) intended to selectively inhibit the electrical supply of the metal strip (22).

42 Claims, 8 Drawing Sheets

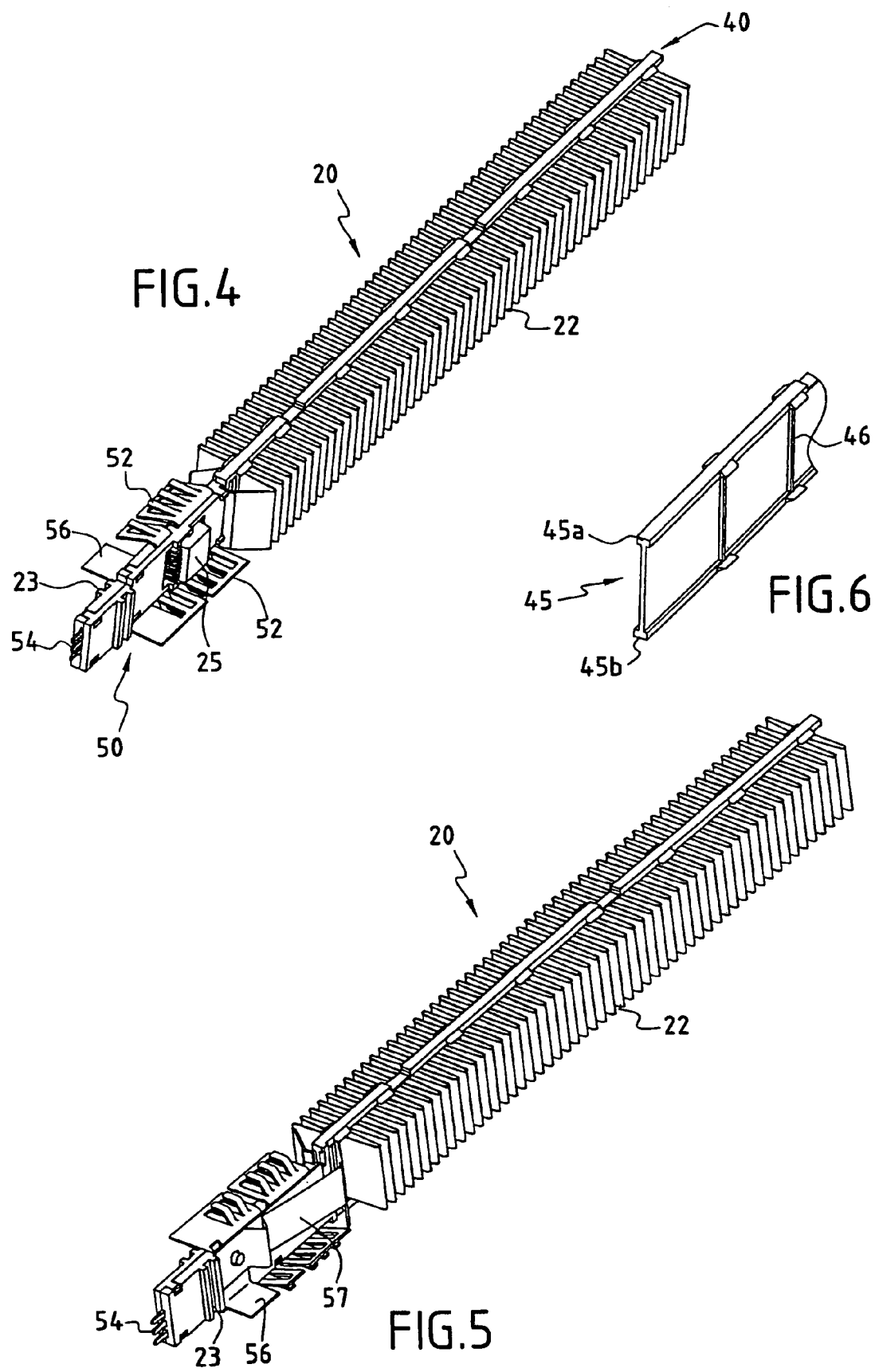

ELECTRIC HEATING DEVICE, IN PARTICULAR FOR A VEHICLE HEATING AND/OR AIR-CONDITIONING APPARATUS

This patent application is a continuation application of U.S. patent application Ser. No. 10/510,769 filed Oct. 12, 2004 now abandoned.

BACKGROUND OF THE INVENTION

The invention concerns an electric heating device comprising an electric radiator passed through by the air to be heated and in particular passed through by at least part of an air flow produced by an air flow generator, such as a fan or blower.

The field of application of the invention is more particularly that of heating and/or air-conditioning apparatuses for vehicles, in particular private and commercial motor vehicles and heavy lorries.

Usually, the heating up of the air intended for heating the passenger compartment of a motor vehicle, and for demisting and defrosting, is provided by passing a flow of air through a heat exchanger through which the engine block cooling liquid runs.

This heating method may prove unsuitable or insufficient in a number of situations such as:
- preconditioning before starting the engine in order to provide heating up of the passenger compartment, and defrosting or demisting, in a remote or pre-programmed manner, before use of the vehicle in a very cold environment,
- desired very fast rise in temperature in the passenger compartment,
- inability of the heat exchanger to supply the calories necessary for satisfactory heating up of the air in order to provide the heating functions and possible defrosting and demisting functions, as occurs during a certain time after starting, with certain types of engine with low heat loss.

To overcome these drawbacks, a known solution, among others, consists of adding to the heat exchanger an electric radiator disposed downstream of the exchanger in the circulation duct for the air to be heated up. The operation of the electric radiator is controlled on a temporary basis, until the heat exchanger on its own can provide the heating of the air in the required manner.

Usually, such a supplementary electric radiator uses resistive elements in the form of positive temperature coefficient (PTC) resistors. The use of PTC resistors in fact allows temperature self-limiting so that excessive heating is avoided. The PTC resistors are in the form of small blocks or "jewels", disposed in heating bars, between two electrodes. Radiant elements are associated with the bars in order to facilitate heat exchange with the air flow passing through the radiator. These radiant elements can be fins through which the bars pass or else inserts for example in the form of pleated or corrugated metal strips disposed between parallel bars.

The additional PTC resistor electric radiators work satisfactorily but have the drawback of having a high production cost owing to the cost of the PTC resistors, the number of constituent components, the necessary assembly time and the sensitivity to corrosion of the supply electrodes of the PTC resistors.

OBJECT AND SUMMARY OF THE INVENTION

The aim of the invention is to provide an electric radiator for a vehicle heating or air-conditioning apparatus or, more generally, for an apparatus for heating any type of passenger compartment which has a competitive cost compared with that of PTC resistor electric radiators and which has a simplified architecture in comparison therewith whilst allowing optimisation of the thermal exchanges with air to be heated up.

Another aim of the present invention is to limit the number of components of the radiator, thus facilitating its mounting and reducing the manufacturing costs.

These aims are achieved by means of a heating device which comprises an electric radiator for heating the air passing through it, said radiator comprising a casing, at least one resistive element mounted in the casing and constituted by at least one zigzag metal strip which is disposed so as to be directly exposed to the air passing through the casing, and a circuit for controlling the electrical supply of the resistive element or elements connected to a power supply, characterised in that the electric radiator comprises a set of individual heating modules disposed parallel to one another in the casing and so as to be directly exposed to the air passing through the casing, each heating module comprising a pleated or corrugated metal strip and an electronic switch controlled by the control circuit intended to selectively inhibit the electrical supply of the metal strip.

Each heating module also comprises an electrically insulating support comprising a moulded rail intended to accommodate and hold in position said metal strip.

Advantageously, the moulded rail has flanges between which the tops of the corrugations are held laterally and separations for maintaining a certain regularity of the pitch of the corrugated or pleated metal strip.

Each heating module comprises at least one thermal and electrical protection element, directly exposed to the air passing through the heating module and in series with the metal strip.

The protection element comprises at least one hot-melt link in series with a metal strip.

Preferably, the protection element comprises a spring blade and a hot-melt link formed by a brazed joint between one end of the metal strip and one end of the spring blade, the other end of the spring blade being immovably attached to the support and electrically connected to a terminal.

The brazed joint of the hot-melt link has a melting point matching an upper temperature limit and can be formed by a eutectic solder joint.

Advantageously, the spring blade is directly exposed to the air passing through the heating module and openings in the form of louvres are formed in the spring blade.

The spring blade has a cross-section smaller than or equal to and a resistivity greater than or equal to that of the metal strip.

According to a preferred embodiment, a metal connection support connected to the electrical power supply is integrated into the insulating support allowing the electrical supply of the metal strip.

The electronic switch is integrated onto the metal connection support through tracks formed by said metal support and flanges are formed in the metal support facilitating the heat dissipation of the electronic switch by the air passing through the heating module.

The end of the spring blade immovably attached to the support can be soldered permanently to the connection terminal, electrically independent of the metal connection support, thus allowing electrical connection of the strip or of the spring blade to an external terminal or busbar.

Preferably, each heating module also comprises at least one protection mechanism of reversible or resettable type connected directly or indirectly to the metal strip preventing excessive heating. This protection mechanism can be a thermal sensor or detector delivering information to the control circuit, matching the temperature of the metal strip or of the spring blade in order that the control circuit disconnects the electrical supply in the case of excessive heating.

The thermal sensor or detector is connected thermally to the spring blade and comprises an element chosen from amongst an NTC resistor, a PTC resistor, a bimetallic strip and a PTC effect polymer switch.

Advantageously, the spring blade has a PTC effect thus providing the function of a thermal sensor.

Each heating module can have a heating power of between 0 and 500 W and preferably between 300 W and 400 W.

The casing comprises a set of cells intended to accommodate and hold in place each heating module by means also of a cover.

The control circuit can comprise means of varying the power supplied by the radiator by modulating the supply voltage delivered to each heating module, for example by the pulse width modulation technique, which makes it possible to vary the power continuously or almost continuously.

Advantageously, the different heating modules comprise metal strips having substantially identical resistances.

Preferably, each metal strip of each heating module has a corrugation pitch with a length of between 1.8 mm and 6 mm; a peak-to-peak amplitude between corrugation tops of between 5 mm and 20 mm; a width of between 5 mm and 20 mm; and a thickness of between 50 μm and 250 μm and preferably between 80 μm and 180 μm.

Each metal strip is made of a material chosen from amongst an iron-based alloy and a copper-based alloy.

Preferably also, the copper-based alloy is an alloy chosen from amongst CuNi30, CuNi45 and CuNi18Zn20.

Advantageously, the material is an alloy having a positive temperature coefficient resistance effect.

According to a preferred embodiment, openings in the form of louvres are formed in each strip. The louvres comprise fins which form an angle of between 20° and 35° with respect to the plane of the strip.

Advantageously, each strip is provided with an electrically insulating and/or corrosion protection covering.

Each metal strip has a profile chosen from amongst a sinusoidal profile, a triangular profile, a rectangular profile and a trapezoidal profile. According to a preferred embodiment, the heating device also comprises an air flow generator, characterised in that the electrical switches driven by the control circuit inhibit the electrical supply of the heating modules when the air flow rate passing through the radiator is below a minimum value, in order to provide protection against excessive heating.

According to a particular feature of the heating device, the air flow generator comprises a fan, characterised in that means are provided for supplying the control circuit with a signal representing the speed of rotation of the fan in order to inhibit the electrical supply of the heating modules when the speed of rotation of the fan is below a predetermined threshold.

Another object of the invention is a motor vehicle heating or air-conditioning apparatus using a heating device as defined above.

In such a heating or air-conditioning apparatus, the radiator of the heating device can be disposed in an air circulation channel downstream of a possible liquid heat exchanger.

According to a particular feature of the heating or air-conditioning apparatus, the electric radiator can be housed in proximity to an air outlet aperture.

BRIEF DESCRIPTION OF THE DRAWINGS

The invention will be better understood from a reading of the description given hereinafter, on an indicative but non-limiting basis, with reference to the accompanying drawings, in which:

FIGS. 4 and 5 are perspective views of a heating module of the radiator of FIGS. 2 and 3;

FIG. 6 is a partial detail view of a moulded rail of the heating module of FIGS. 4 and 5;

DETAILED DESCRIPTION OF EMBODIMENTS

Figure 1:
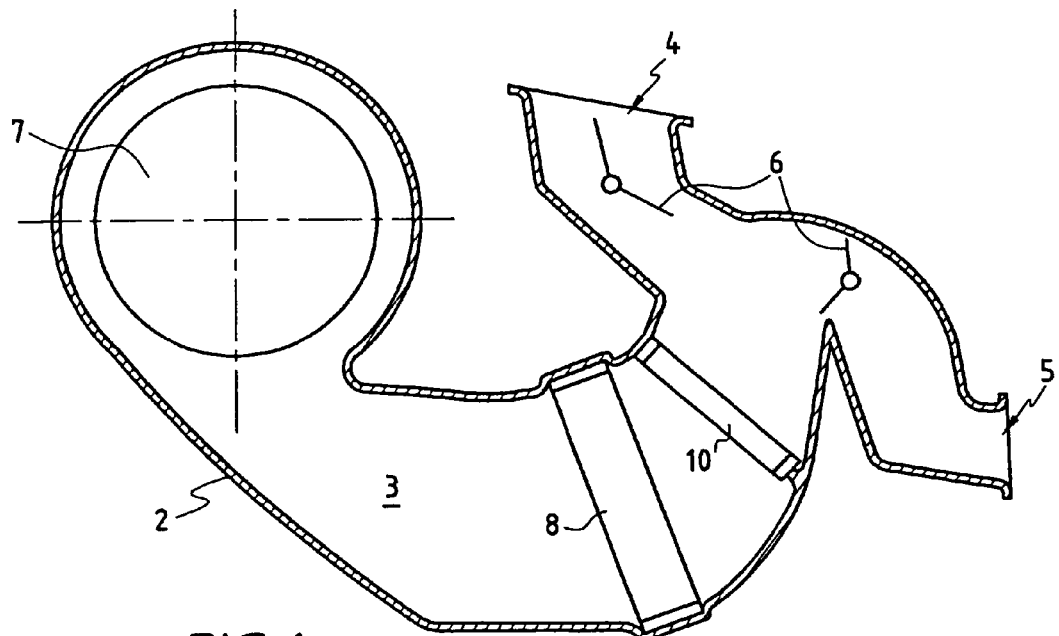
FIG. 1 is a highly schematic partial view of a heating apparatus for a motor vehicle.

FIG. 1 shows part of a motor vehicle heating apparatus, comprising a casing 2 delimiting a channel 3 for the passage of air to be heated up. The channel 3 conveys the air to heating and demisting/defrosting apertures in order to be selectively distributed in the passenger compartment according to the positions of mixing and distribution flaps 6. The air flow rate in the channel 3 is produced by a blower 7, or fan, receiving external air or recirculation air coming from the passenger compartment. The heating up of the air, when necessary, is provided by a possible liquid heat exchanger 8, using the cooling liquid of the engine as a heat-conducting liquid, and by an electric radiator 10. The exchanger 8 and the electric radiator 10 are disposed in the channel 3, the first being situated upstream of the second. In the absence of the exchanger 8, the heating of the air is provided by the electric radiator 10 alone.

The electric radiator 10 can occupy all or part of the passage cross-section of the channel 3. In the latter case, only part of the air flow produced by the fan 7 passes through the electric radiator, the other part being diverted outside thereof.

One method of mounting an electric radiator in a heating and air-conditioning apparatus is described in particular in the French patent application 01 09 076 of the applicant.

One example implementation of an electric radiator 10 in accordance with the invention will now be described with reference to FIGS. 2 to 15.

Figure 2:
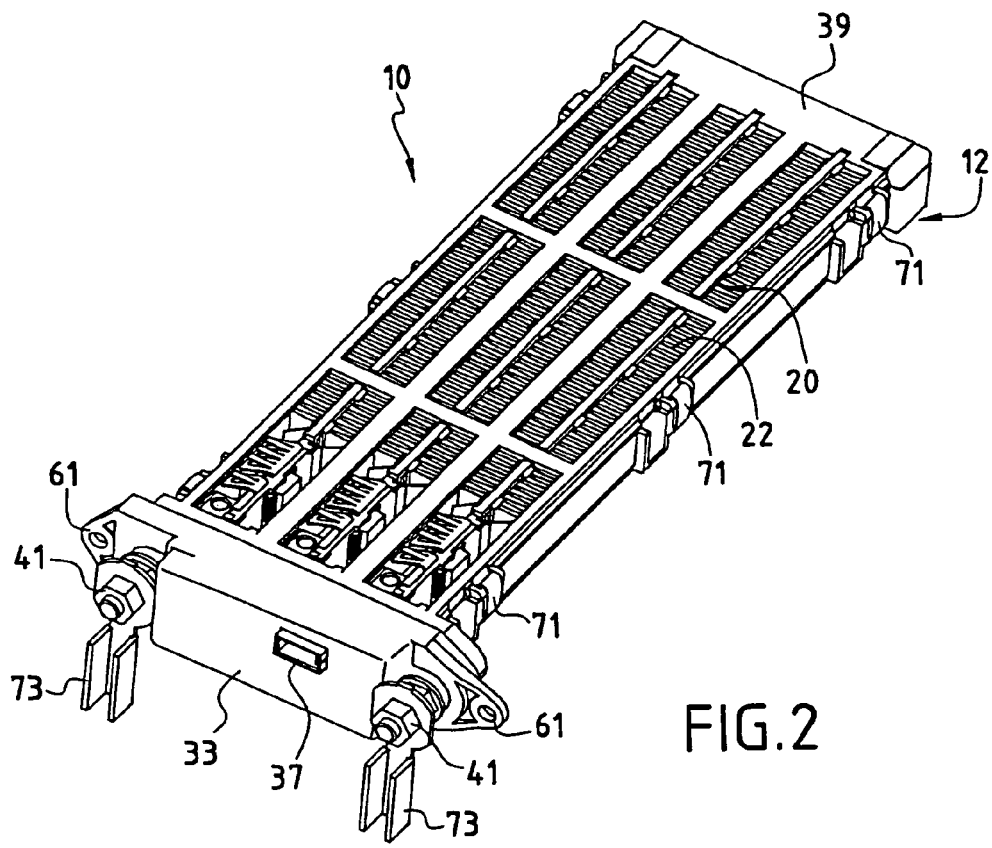
FIGS. 2 and 3 are perspective views of one embodiment of an electric radiator for a heating device according to the invention.
Figure 3:
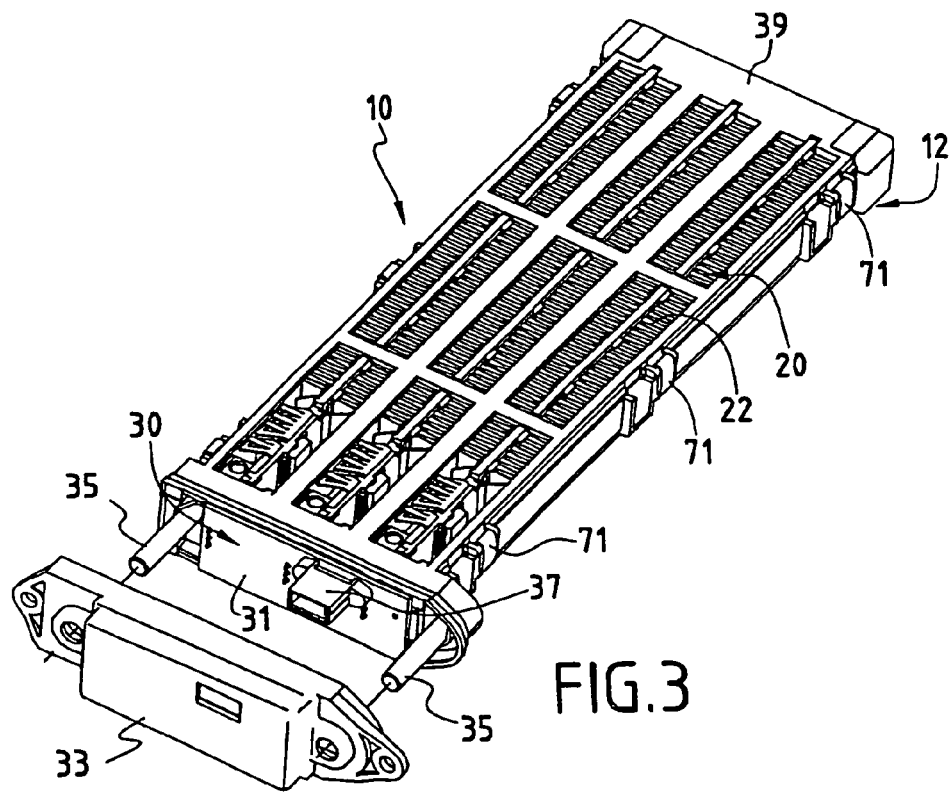

As shown in FIGS. 2 and 3, the electric radiator 10 comprises a casing 12, for example made of plastic, in which there is housed a set of individual heating modules 20. The individual heating modules 20 are disposed parallel to one another and extend over the entire length of the casing 12, so as to be directly exposed to the air passing through this casing.

The control of the electric radiator 10 is provided by a control circuit 30 mounted on a printed circuit board 31 advantageously housed in one of the sides of the casing 12 and protected by a cap 33.

The control circuit 30 receives information through a connector 37 and is connected to a power supply through busbars 35 or through the connector.

As shown in FIGS. 4 and 5, each individual heating module 20 comprises a metal strip 22, preferably pleated or corrugated, and an electronic switch or change-over switch 25, for example in the form of a power transistor. The electronic switch 25 is controlled by the control circuit 30 in order to selectively inhibit the electrical supply of the metal strip 22.

Advantageously, the different heating modules comprise metal strips 22 having substantially identical resistances and a heating power of between 0 and 500 W and preferably between 300 W and 400 W.

The individual heating module 20 comprises an electrically insulating support 40 comprising a rigid moulded rail 45 intended to accommodate and hold in position an identical continuous strip.

The moulded rail 45, as shown in FIG. 6, has an H-shaped cross-section and has flanges 45a, 45b between which the tops of the corrugations are held laterally. Thus, the continuous strip is disposed in two rows, winding around the lateral sides of the moulded rail 45. The strip 22 is turned back or curved at one end of the moulded rail 45. In a variant, the strip can be in two segments soldered to the end of the moulded rail 45.

The moulded rail 45 incorporates separations 46 making it possible to clamp the strip 22 and maintain a certain regularity of the corrugation pitch of the strip.

Thus, the insulating support 40 participates in the holding, guidance and anchorage of the metal strip 22 mechanically.

However, the strip 22 can be fixed to the moulded rail 45 by gluing of corrugation tops on this moulded rail in order to limit noise-generating vibrations.

The electrical supply of the strip is carried out via a metal electrically conductive connection support 50, for example made of copper or one of its alloys. The metal connection support 50 is integrated into the insulating support 40 by overmoulding or by other known methods.

The electronic switch 25 is integrated on the metal connection support 50 through tracks, not depicted, formed by this metal support.

Moreover, dissipating flanges 52 and connection terminals 54 are cut out of the metal support 50. The dissipating flanges 52 facilitate the dissipation of heat of the electronic switch by the air passing through the individual heating module 20, whilst the connection terminals 54 connect this individual heating module to the control circuit 30.

Protection of the radiator against excessive heating is provided by the control circuit 30 and the electronic switches 25 as will be explained later. However, for the sake of maximum safety, additional protection against excessive heating of the radiator is provided by means of at least one thermal and electrical protection element in each individual heating module. This protection element must be in series with the metal strip and preferably must be directly exposed to the air passing through the heating module.

Figure 7:
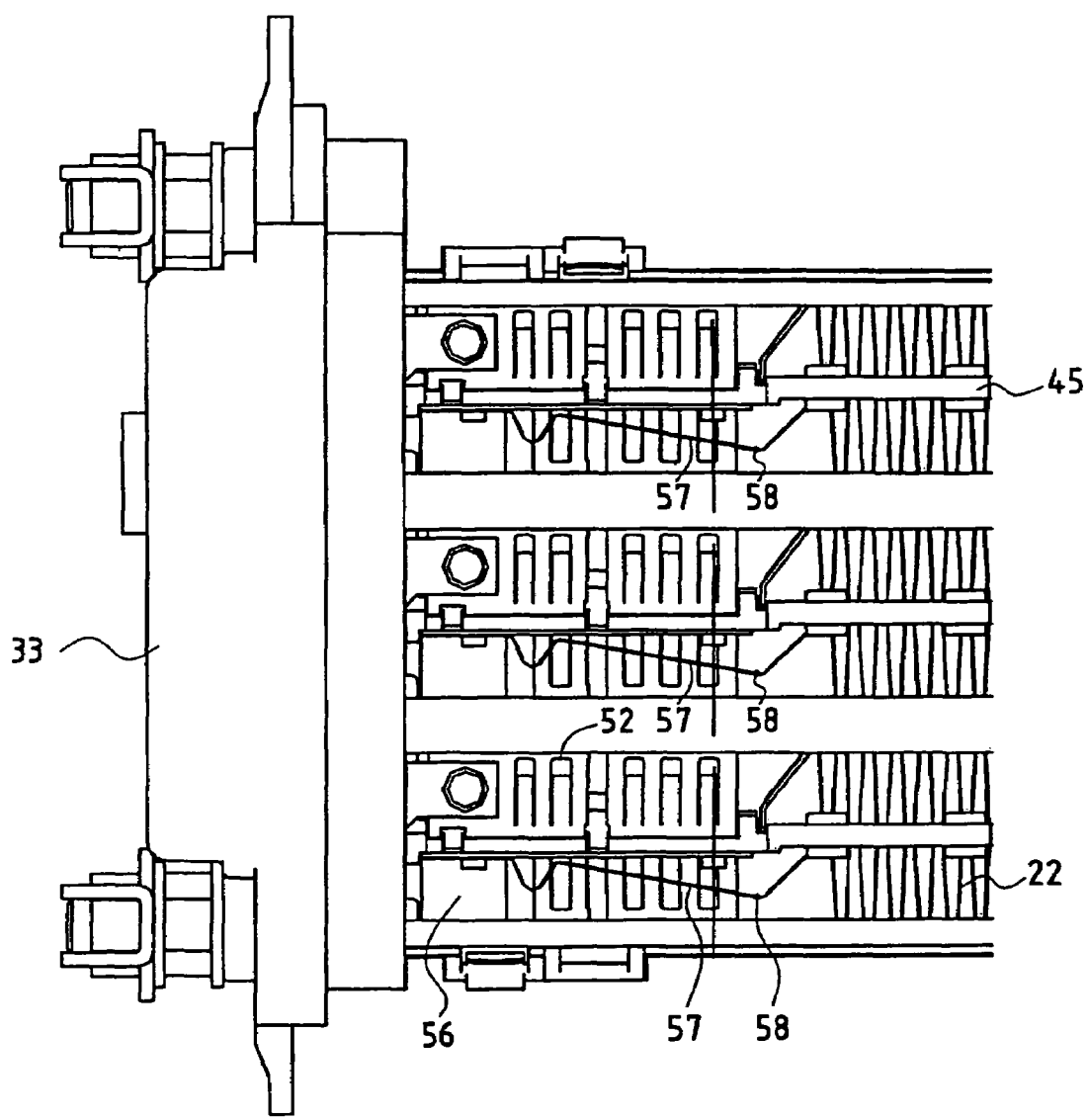
FIG. 7 is a partial plan view of the electric radiator of FIGS. 2 and 3.
Figure 8:
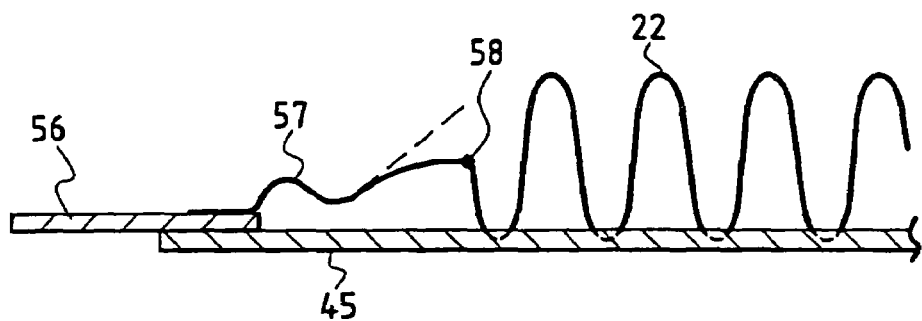
FIGS. 8 and 9 are partial detail views showing variant implementations of a hot-melt link for protecting the radiator against excessive heating.

FIGS. 7 and 8 show an example of a protection element consisting of a spring blade 57 and a hot-melt link 58 formed by a brazed joint between one end of the metal strip 22 and one end of the spring blade 57. The other end of the spring blade 57 is fixed, for example by a permanent weld, to a connection terminal 56 which is immovably attached to the support 40 of the metal strip 22. The connection terminal 56 connects the strip 22 to a busbar 35 and is electrically independent of the metal connection support 50.

The brazed joint composition used for the electrical link is chosen so that this brazed joint has a precise melting point at a temperature representing an upper permissible temperature limit. This limit is fixed so that the protection by opening of the hot-melt link is the one which acts last. By way of example, the hot-melt link 58 can be formed by a eutectic solder joint such that its melting temperature is approximately 165° C.

This is because this protection aims to protect the plastic components of the electric radiator from any deformation or combustion. It is a final protection and is active in the case of a failure of the electronics due for example to a short circuit.

On account of the elastic prestressing exerted on the spring blade 57, the melting of the hot-melt link allows a relaxation of the spring blade 57 and therefore a definite opening of the link.

Being directly exposed to the air passing through the radiator, the spring blade 57 participates in part in the heating of the air.

Moreover, the spring blade 57 has a cross-section less than or equal to and a resistivity greater than or equal to that of the metal strip 22. Consequently, the density of the current through the spring blade 57 is greater than that passing through the strip 22 and therefore the spring blade 57 heats up more quickly than the strip 22.

In other words, the thermal gradient of the spring blade 57 is greater than that of the strip 22 and therefore the blade is more sensitive to temperature changes.

In the vicinity of the hot-melt link, the spring blade 57 has a temperature greater than that of the strip 22 thus compensating for any temperature difference all along the strip 22.

The constituent material of the spring blade as well as its shape and size are chosen according to the electrical and thermal conductivity necessary for meeting optimum protection.

The material can be chosen from amongst metals with a high electrical resistivity, like a copper alloy, such as for example CuNi30. The spring blade can have a width of approximately 10 mm, a thickness of approximately 100 µm, a length of between 15 mm and 30 mm and a resistance less than or equal to 10 mΩ.

Moreover, openings (not depicted) in the form of louvres can be formed in the spring blade thus increasing its thermal sensitivity in the case of low air flow rate.

The result of all these characteristics is that the protection element reacts fairly quickly to any excessive heating of the radiator for different air flow rates through the radiator. The protection is valid at the time of a progressive lowering of the air flow or at the time of a sudden cutoff of the air flow.

Moreover, the protection element of FIG. 8 can act as a fuse in the case of short-circuiting of the metal strip with an external electrical potential.

Figure 9:
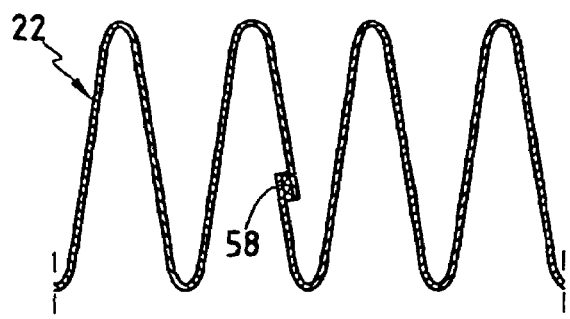

FIG. 9 shows that a hot-melt link 58 can also be formed by cutting up a strip 22 and connecting its sections by brazing by means of an adapted brazed joint.

Figure 10:
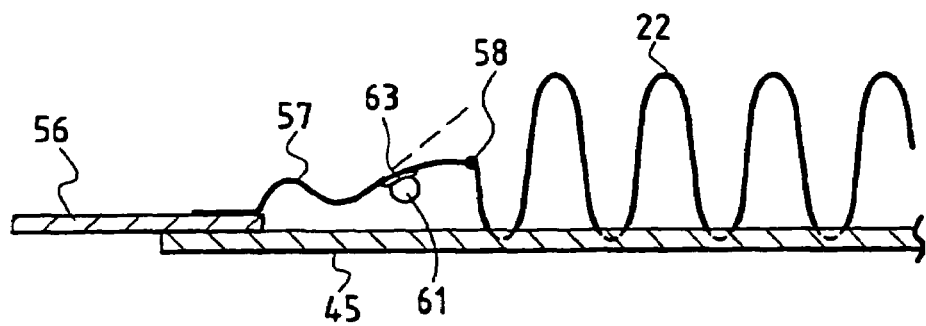
FIG. 10 is a partial detail view showing a reversible protection mechanism in addition to the hot-melt protection link of FIG. 8.

FIG. 10 shows that use can be made of a reversible or resettable protection mechanism, connected directly or indirectly to each metal strip, against excessive heating defined by a temperature below that corresponding to the melting point of the hot-melt link.

This reversible protection mechanism can consist of a thermal sensor or detector delivering information to the control circuit, matching the temperature of the metal strip or of the spring blade, in order that the control circuit disconnects the electrical supply in the case of excessive heating.

Preferably, the thermal sensor or detector 61 is thermally connected, for example by a thermal adhesive 63 or resin, to the spring blade 57.

The thermal sensor or detector can be of a type known per se, such as a bimetallic strip having an adapted opening threshold, a PTC resistor, an NTC resistor or a PTC effect polymer switch connected directly or indirectly to the metal strip.

Advantageously, the spring blade can have a PTC effect thus providing the function of a thermal sensor.

Figure 11:
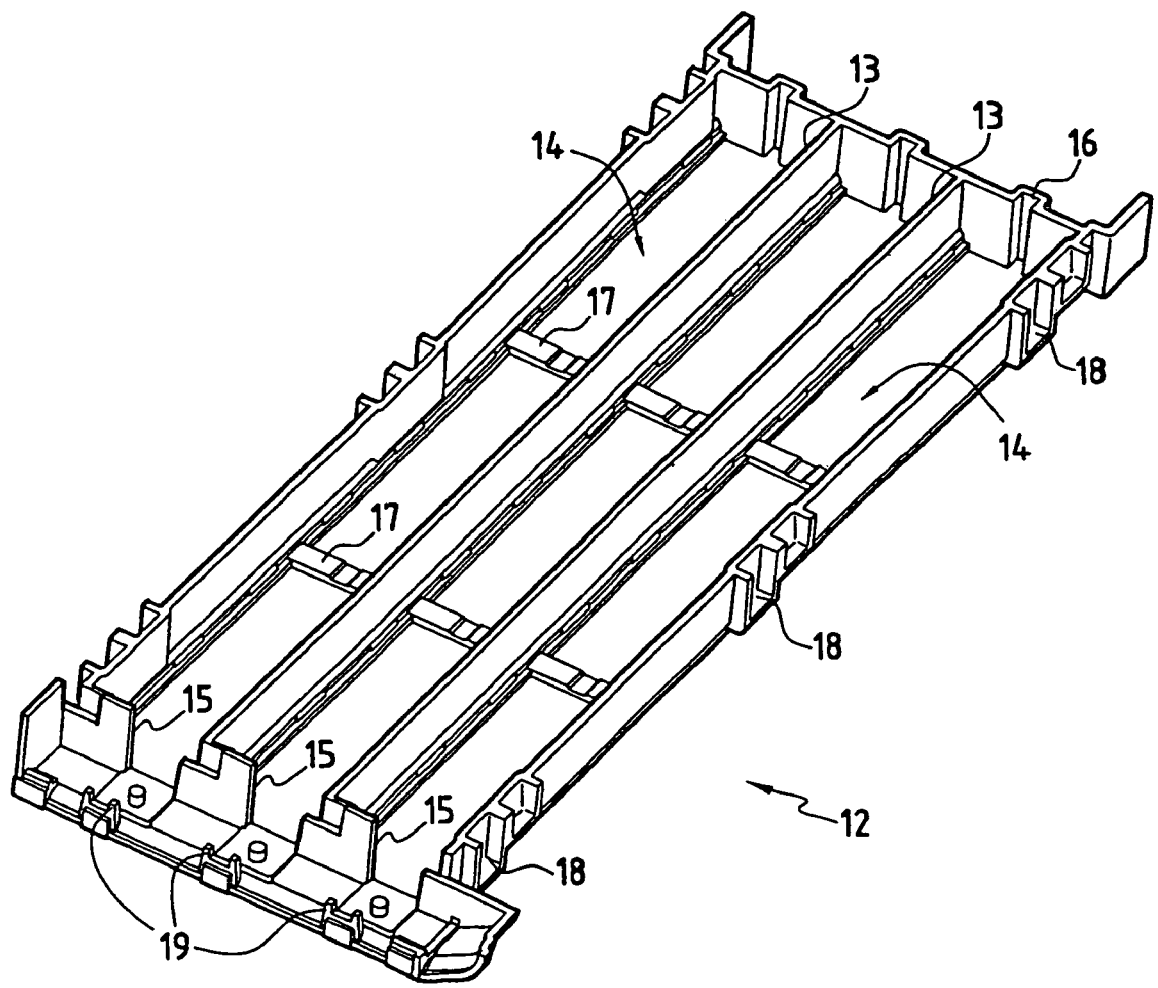
FIG. 11 is a perspective view of a casing of an electric radiator of FIGS. 2 and 3.
Figure 12:
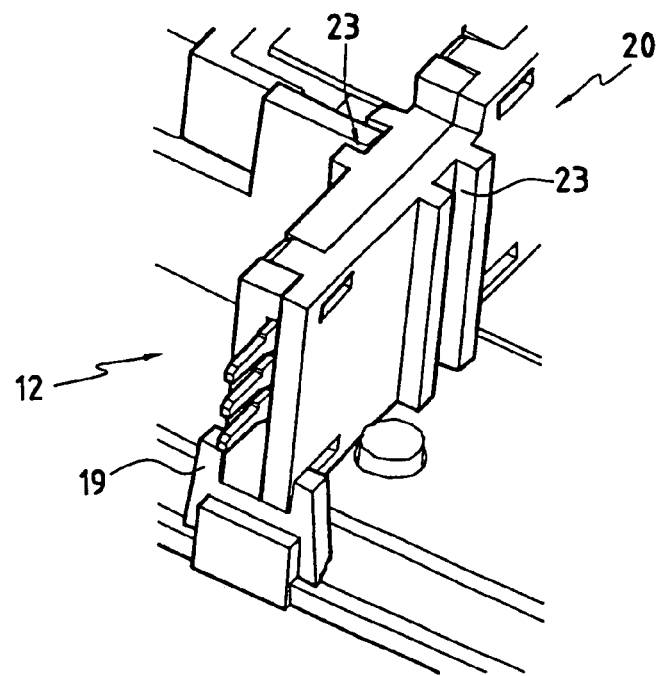
FIGS. 12 and 13 are partial detail views showing the positioning of a heating module of the radiator of FIGS. 2 and 3.
Figure 13:
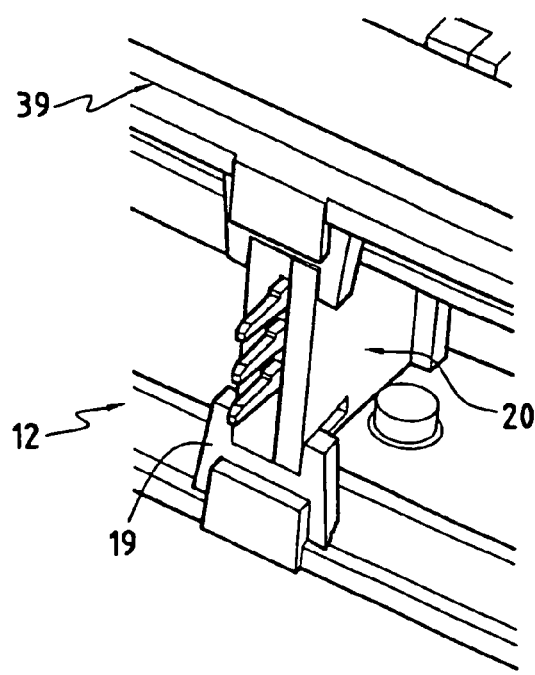
Figure 14:
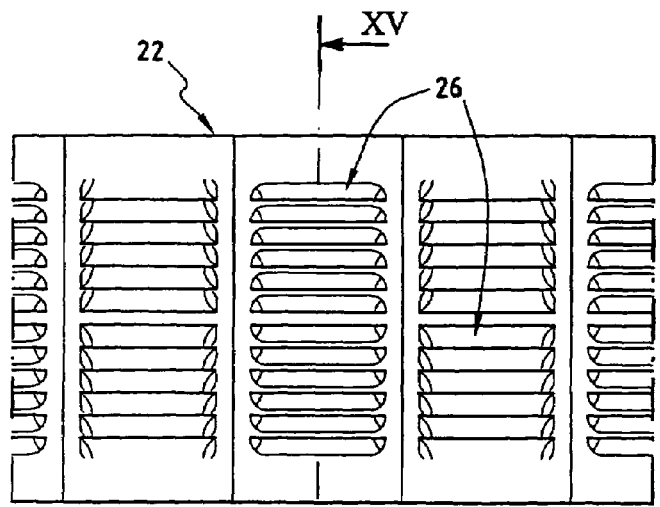
FIG. 14 is a partial plan view, on an enlarged scale, of a metal strip with louvre for a heating module of FIGS. 4 and 5 (in the non-pleated state)
Figure 15:
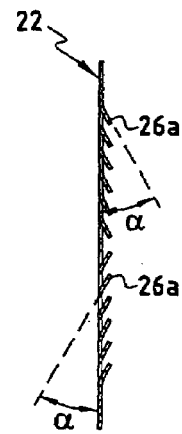
FIG. 15 is a sectional view along the plane XV—XV of FIG. 14.

FIGS. 11 to 13, in addition to FIGS. 2 to 6, show the mounting of the individual heating modules 20 in the casing 12.

In effect, the casing is rectangular comprising longitudinal walls 13 which define between them a set of cells 14. By way of example, FIG. 11 shows three cells, intended to accommodate and hold in place three individual heating modules 20. Of course, this number is in no way limiting and can be different.

Each heating module 20 is clamped in the cell 13 of the casing 12 via the edges or tops of the metal strip 22 against the longitudinal walls 13.

On one transverse side of the casing 12, each longitudinal wall 13 ends with a transverse return or shoulder 15 which fits in a corresponding slot 23 formed on one end of each support 40 of the individual heating module 20. This provides polarisation and correct positioning of the individual heating module 20 and its components, in particular the electronic switch. Similarly, at the same transverse side, notches 19 are formed for adjusting the positioning of the individual heating modules 20.

The opposite transverse side comprises slots 16 intended to accommodate the ends of the moulded rails 45 of the individual heating modules 20.

Moreover, the casing can comprise central cross members for rigidifying the casing and better supporting the individual heating modules 20.

A cover 39 comprising openings of the same shapes and dimensions as the cells 14 plugs on the casing 12. In fact, the external longitudinal walls of the casing 12 comprise recesses 18 intended to accommodate clips or clasps 71 formed in the cover 39.

The internal face of the cover 39 comprises a system for clamping and positioning the heating modules, identical or symmetrical to that of the casing, as shown in FIG. 13.

The casing 12 and the cover 39 delimit, by means of their cells and corresponding openings, the cross-section of passage of the air through the metal strips 22 and electronic switches 25. Thus, the air flow is heated by the strips whilst cooling the electronic switches.

The casing 12, the cover 39, the cap 33 and the moulded rails 45 of the heating modules 20 are produced from an electrically insulating material, for example a plastic material capable of withstanding the maximum temperature reached in service, that is to say a temperature which may go up to 150° C. Plastic materials which can be used are for example PBT, PPS, PPA, PA66 and PA6, possibly reinforced with glass fibres. The casing 12 can be moulded in a single piece.

The busbars 35 are fixed in the casing 12 by rivet heading or can be crimped or clipped on the cover 39 and the casing 12. In a variant, the busbars 35 can be integrated in the casing by overmoulding.

The busbars 35 can be threaded in order to fix power terminals 73 of the electrical supply by a system of nuts 41.

Furthermore, the electric radiator comprises fixing and guidance means 61 in order to facilitate its mounting and integration in a heating and air-conditioning apparatus.

Moreover, the electric radiator comprises a sealing bead in order to limit air leakages between the channel which conveys the air to be heated and the external environment.

The metal strips 22 have their main faces disposed substantially parallel to the direction of flowing of the air flow through the casing 12, so as to limit the pressure loss due to the passage of the air in the electric radiator. In order to increase the thermal exchange between the strips and the air flow to which they are directly exposed, louvres 26 (shown only in FIGS. 14 and 15) can possibly be formed in the strips. The louvres 26 are produced by cutting out fins 26a and deforming these slightly outside the plane of the strips.

The louvres make it possible to increase the efficiency of the thermal exchange by virtue of the turbulence created at the cells of the fins 26a. The angle between the fins and the plane of the strip is preferably between 20° and 35° in order to obtain a good compromise between the sought effectiveness of the fins and the pressure loss they lead to by increasing the air resistance.

The strips 22 are preferably covered with a layer having an electrical insulation function, for example an insulating varnish or a resin such as an epoxy resin, possibly also capable of having a corrosion protection function.

The constituent material of the strips 22 as well as their shapes and dimensions are chosen according to a number of constraints or characteristics such as the electrical resistance necessary for satisfying the power requirements, the resistivity, feasibility, geometrical parameters of the electric radiator, etc.

The material can be chosen from amongst metals with a high electrical resistivity which are capable of being put in the form of ribbons from which bands can be cut out and pleated in order to form the strips 22. Such metals are in particular iron- or copper-based alloys containing in particular nickel and/or tin. Preferably, the material of the strips consists of CuNi30, CuNi45 or CuNi18Zn20. Advantageously, these alloys can have a positive temperature coefficient resistance effect.

The metal strips can have sinusoidal, triangular, rectangular or trapezoidal shapes.

The shapes and dimensions of a strip 22 can be dictated by various considerations.

The thickness of the strip must be sufficient to allow the industrial working of the metal ribbon, but remain limited in order to not create too high an air resistance. A thickness value of between approximately 50 µm and 250 µm is preferred.

The corrugation pitch or period of a pleated strip must not be too small at the risk of creating too high an air resistance. On the other hand, beyond a certain value, too great a pitch prejudices the thermal exchange surface without providing any substantial advantage in terms of reduction of air resistance, that is to say reduction of pressure loss between the two faces of the radiator. A pitch value of between approximately 1.8 mm and 6 mm is preferred.

The width and the peak-to-peak height or amplitude between corrugations depend on the space available for the electric radiator. Furthermore, the width of the strip must be sufficient to provide mechanical strength of the strip but remain limited to avoid too large a space requirement. A width value of between approximately 5 mm and 20 mm is preferred.

The height must not be too small in order to not contribute towards a high air resistance. On the other hand, this height must be limited in order to retain rigidity and sufficient strength of the strip. A height value h of between approximately 5 mm and 20 mm is preferred.

The length of a pleated strip, that is to say the length of the moulded rail, depends on the space available for the electric radiator. In a motor vehicle heating apparatus, this length is usually from one to a few tens of centimetres.

Thus, the basic architecture of the electric radiator is formed by the association of a set of individual heating modules and standards. This is because each heating module comprises all the functions allowing it to be independent of the other modules, that is to say it comprises a strip, a strip support, an electronic switch and at least one thermal protection element. Moreover, the electronic power part of the modules is separate from the control electronics, thus making it possible to standardise the heating modules.

Figure 16:
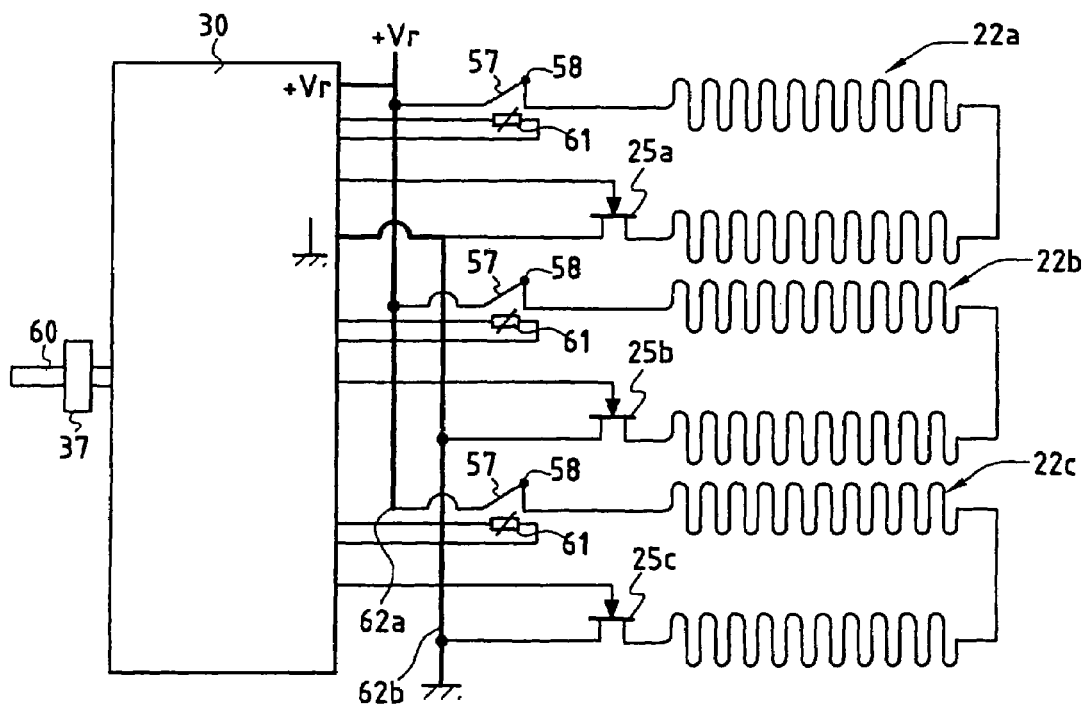
FIG. 16 is an embodiment of an electrical diagram of a radiator of a heating device according to the invention.

FIG. 16 is an electrical diagram of the radiator illustrating a control circuit 30, electronic switches 25a, 25b, 25c and metal strips 22a, 22b, 22c according to the invention.

The control circuit 30 receives through the connector 37 an item of information, for example of logic type, transported by a data bus 60 and representing the required heating power level P. The circuit 30 is also connected to an energy bus formed from a conductor 62a at electrical network potential +Vr available in the vehicle, for example the battery voltage, and a conductor 62b taken to the reference potential (earth). In a variant, the circuit 30 can be supplied with energy via the connector 37 and in that case its connection with the conductor 62a can be omitted.

In the example of FIG. 16, there are three strips. One terminal of each strip is connected to the conductor 62b via its corresponding switch whilst the other terminal of each strip is connected to the conductor 62a via the hot-melt link 58 and the spring blade 57. In addition, a thermal detector 61, connected to the control circuit, is mounted at the level of each spring blade 57. Thus, each thermal detector delivers an item of information to the control circuit, matching the temperature of the associated spring blade.

In the case of excessive heating due to insufficient removal of the calories produced, for example when the air flow rate passing through a heating module is below a minimum value, the corresponding electronic switch, driven by the control circuit 30, inhibits the electrical supply of the heating module.

Furthermore, in a known manner, a signal representing the speed of rotation of the fan can be sent to the control circuit 30 in order to inhibit the electrical supply of the individual heating modules when the speed of rotation of the fan is below a predetermined threshold.

It is possible to vary the power continuously or almost continuously by modulating the electrical supply voltage of the metal strips, or at least of one of them. The modulation can be carried out in a known manner by pulse width modulation (PWM), the voltage Vr being chopped in order to be delivered to the metal strips in the form of a pulse train in which the ratio between width and period of the pulses is variable. Modulated simultaneous supplying of all the metal strips makes it possible, irrespective of the power level P, to uniformly distribute the heat emission in the entire cross-section of passage of the air in the electric radiator.

The electric heating device according to the invention can be used in heating and/or air-conditioning apparatuses other than those of FIG. 1.

Figure 17:
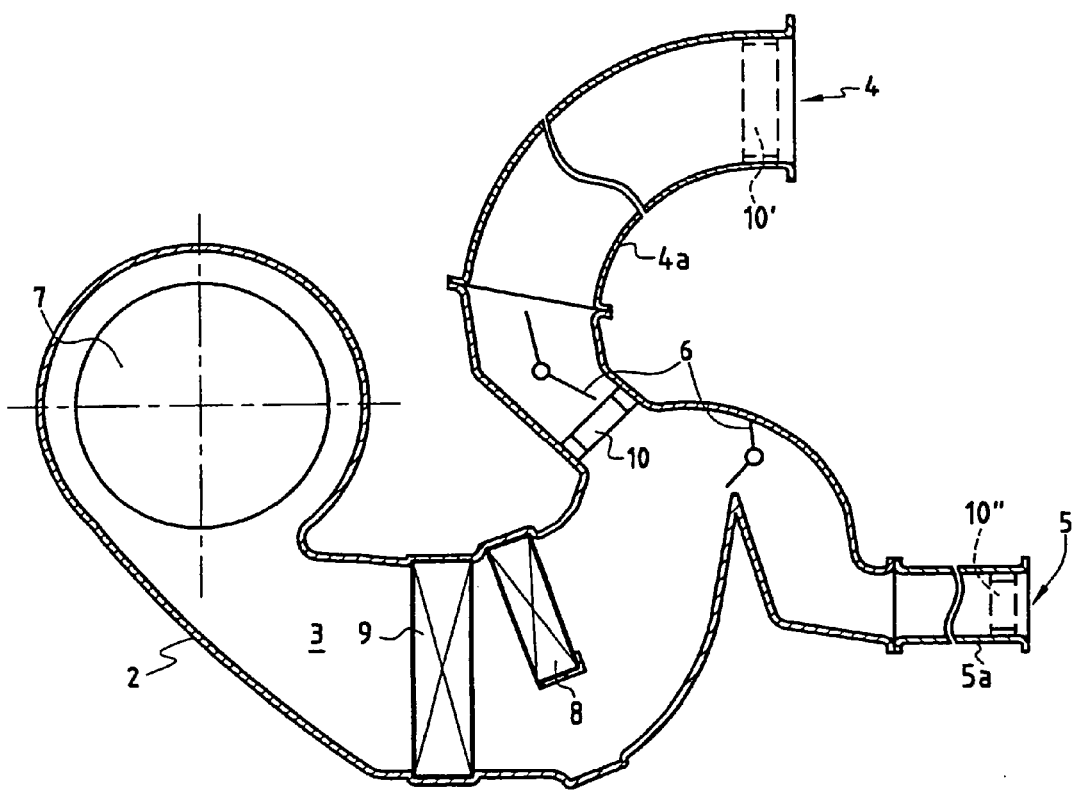
FIG. 17 illustrates highly schematically another embodiment of a heating and/or air-conditioning apparatus using a heating device according to the invention.

Thus, FIG. 17 shows a heating and/or air-conditioning apparatus for a motor vehicle which is distinguished from that of FIG. 1 in that the radiator 10 is not situated in proximity to the heat exchanger 8, but in the immediate vicinity of an output of the heating apparatus connected by a duct 4 to a demisting/defrosting aperture 4a. A radiator in accordance with the invention could also be mounted in the vicinity of the demisting/defrosting aperture 4a, as shown by the reference 10', or in the vicinity of a heating aperture 5a of the passenger compartment connected to the channel 3 by a duct 5 as shown by the reference 10".

Moreover, FIG. 17 shows that a radiator 10 in accordance with the invention can be integrated in a motor vehicle air-conditioning device comprising in the channel 3 a cooling circuit evaporator 9, upstream of the heat exchanger 8, occupying in this example only part of the cross-section of the channel.

The invention claimed is:

1. An electric heating device comprising:
   an electric radiator comprising a set of individual heating modules and a casing;
   at least one resistive element constituted by at least one zigzag metal strip mounted in the casing;
   a power supply;
   a resistive element or elements connected to the power supply;
   a control circuit for controlling the electrical supply of the resistive element or elements; wherein each heating module (20) comprise a pleated or corrugated metal strip (22) and an electronic switch (25) controlled by the control circuit, wherein the pleated or corrugated metal strip (22) and the electronic switch (25) selectively inhibit the electrical supply of the metal strip (22), wherein each heating module (20) also comprises an insulating support (40), and the insulating support (40) comprises a molded rail (45) to hold the metal strip (22) in position, and
   wherein when air passes through the radiator the at least one zigzag metal strip is disposed so as to be directly exposed to the air passing through the radiator and wherein the in individual heating modules (20) are disposed parallel to one another in the casing.

2. An electric heating device according to claim 1, wherein the molded rail (45) has flanges (45a, 45b) and separations (46) to hold the pleats or corrugations of the metal strip laterally and to maintain a certain regularity of the pitch of the corrugated or pleated metal strip (22).

3. Device according to claim 2, wherein each metal strip (22) of each heating module (20) has a corrugation period with a length of between 1.8 mm and 6 mm.

4. Device according to claim 2, wherein each metal strip (22) of each heating module has a peak-to-peak amplitude between corrugation tops of between 5 mm and 20 mm.

5. An electric heating device according to claim 1, wherein the heating module comprises at least one thermal and electrical protection element directly exposed to the air passing through the heating module and in series with the metal strip (22).

6. An electric heating device according to claim 5, wherein the protection element comprises at least one hot-melt link (58) in series with a metal strip (22).

7. Device according to claim 6, wherein the brazed joint of the hot-melt link (58) has a melting point matching an upper temperature limit.

8. Device according to claim 7, wherein the brazed joint of the hot-melt link (58) is formed by a eutectic solder joint.

9. Device according to claim 5, wherein the protection element comprises a spring blade (57) and a hot-melt link (58) formed by a brazed joint between one end of the metal strip (22) and one end of the spring blade (57), the other end of the spring blade being immovably attached to the support (40) and electrically connected to a terminal 56.

10. Device according to claim 9, wherein the spring blade (57) is directly exposed to the air passing through the heating module (20) and openings in the form of louvres are formed in the spring blade (57).

11. Device according to claim 9, wherein the spring blade (57) has a cross-section smaller than or equal to that of the metal strip (22).

12. Device according to claim 9, wherein the spring blade (57) has a resistivity greater than or equal to that of the metal strip (22).

13. Device according to claim 9, wherein the end of the spring blade (57) immovably attached to the insulating support (40) is soldered permanently to the connection terminal (56) electrically independent of the metal connection support (50) and the strip or the spring blade is electrically connected to an external terminal or busbar (35).

14. Device according to claim 9, wherein the spring blade (57) has a PTC effect thus providing the function of a thermal sensor.

15. Device according to claim 1, wherein a metal connection support (50) connected to the electrical power supply is integrated into the insulating support (40) allowing the electrical supply of the metal strip (22).

16. Device according to claim 15, wherein the electronic switch (25) is integrated onto the metal connection support (50) through tracks formed by said support.

17. Device according to claim 16, wherein flanges (52) are formed in the metal connection support (50) facilitating the heat dissipation of the electronic switch (25) by the air passing through the heating module (20).

18. Device according to claim 15, wherein flanges (52) are formed in the metal connection support (50) facilitating the heat dissipation of the electronic switch (25) by the air passing through the heating module (20).

19. Device according to claim 1, wherein each heating module (20) also comprises at least one reversible or resettable protection mechanism (61) connected directly or indirectly to the metal strip (22), thereby preventing excessive heating.

20. Device according to claim 19, wherein the reversible protection mechanism (61) is a thermal sensor or detector delivering information to the control circuit (30), matching the temperature of the metal strip (22) or of the spring blade (57) in order that the control circuit (30) disconnects the electrical supply in the case of excessive heating.

21. Device according to claim 20, wherein the thermal sensor or detector is connected thermally to the spring blade (57).

22. Device according to claim 20, wherein the thermal sensor or detector comprises an element chosen from the group consisting of an NTC resistor, a PTC resistor, a bimetallic strip and a PTC effect polymer switch.

23. Device according to claim 1, wherein each heating module (20) has a heating power of between 0 and 500 W.

24. Device according to claim 1, wherein the casing (12) comprises a set of cells (14) intended to accommodate and hold in place each heating module (20).

25. Device according to claim 24, wherein the casing (12) has a cover (39).

26. Device according to claim 1, wherein the control circuit (30) comprises means of varying the power supplied by the radiator by modulating the supply voltage delivered to each heating module (20).

27. Device according to claim 26, wherein the control circuit (30) comprises means of varying the supplied power by pulse width modulation.

28. Device according to claim 1, wherein the different heating modules (20) comprise metal strips (22) having substantially identical resistances.

29. Device according to claim 1, wherein each metal strip (22) of each heating module has a width of between 5 mm and 20 mm.

30. Device according to claim 1, wherein each metal strip (22) of each heating module has a thickness of between 50 µm and 250 µm.

31. Device according to claim 1, wherein each metal strip (22) of each heating module is made of a material chosen from amongst an iron-based alloy and a copper-based alloy.

32. Device according to claim 31, wherein the copper-based alloy is an alloy chosen from amongst CuNi30, CuNi45 and CuNi18Zn20.

33. Device according to claim 31, wherein the material is an alloy having a positive temperature coefficient resistance effect.

34. Device according to claim 1, wherein openings in the form of louvres (26) are formed in each strip (22).

35. Device according to claim 34, wherein the louvres (26) comprise fins (26a) which form an angle of between 20° and 35° with respect to the plane of the strip (22).

36. Device according to claim 1, wherein each strip (22) is provided with an electrically insulating or corrosion protection covering.

37. Device according to claim 1, wherein each metal strip (22) has a profile chosen from amongst a sinusoidal profile, a triangular profile, a rectangular profile and a trapezoidal profile.

38. Device according to claim 1, also comprising an air flow generator (7), wherein the electronic switches (25) driven by the control circuit (30) inhibit the electrical supply of the heating modules (20) when the air flow rate passing through the radiator (10) is below a minimum value.

39. Device according to claim 38, in which the air flow generator (7) comprises a fan (3), wherein means are provided for supplying the control circuit (30) with a signal representing the speed of rotation of the fan in order to inhibit the electrical supply of the healing modules when the speed of rotation of the fan is below a predetermined threshold.

40. Heating or air-conditioning apparatus for a motor vehicle comprising a heating device according to claim 1.

41. Apparatus according to claim 40, comprising a liquid heat exchanger and an air circulation channel wherein the electric radiator is disposed downstream of the liquid heat exchanger in the air circulation channel.

42. Apparatus according to claim 41, further Comprising an air outlet aperture wherein the electric radiator is disposed in proximity to the air outlet aperture.

* * * * *